United States Patent
Lee et al.

(10) Patent No.: US 12,549,995 B2
(45) Date of Patent: Feb. 10, 2026

(54) APPARATUS AND METHOD FOR TRANSMISSION AND RECEPTION OF CHANNEL STATE INFORMATION BASED ON ARTIFICIAL INTELLIGENCE

(71) Applicant: ELECTRONICS AND TELECOMMUNICATIONS RESEARCH INSTITUTE, Daejeon (KR)

(72) Inventors: An Seok Lee, Daejeon (KR); Yong Jin Kwon, Daejeon (KR); Han Jun Park, Daejeon (KR); Heesoo Lee, Daejeon (KR); Yun Joo Kim, Daejeon (KR); Hyun Seo Park, Daejeon (KR); Jung Bo Son, Daejeon (KR); Yu Ro Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 335 days.

(21) Appl. No.: 18/316,900

(22) Filed: May 12, 2023

(65) Prior Publication Data

US 2023/0370885 A1 Nov. 16, 2023

(30) Foreign Application Priority Data

May 13, 2022 (KR) .................. 10-2022-0059186
May 12, 2023 (KR) .................. 10-2023-0061743

(51) Int. Cl.
*H04W 28/04* (2009.01)
*H04B 7/06* (2006.01)
*H04W 28/02* (2009.01)

(52) U.S. Cl.
CPC ...... *H04W 28/0215* (2013.01); *H04B 7/0626* (2013.01)

(58) Field of Classification Search
CPC .................. H04W 28/0215; H04B 7/0626
See application file for complete search history.

(56) References Cited

U.S. PATENT DOCUMENTS

| | | |
|---|---|---|
| 8,862,143 B2 | 10/2014 | Damnjanovic et al. |
| 10,305,553 B2 | 5/2019 | O'Shea et al. |
| 10,911,113 B2 | 2/2021 | Wen et al. |

(Continued)

OTHER PUBLICATIONS

Chao-Kai Wen et al., "Deep Learning for Massive MIMO CSI Feedback", arXiv:1712.08919v4 [cs.IT] Apr. 23, 2018.

*Primary Examiner* — Ayaz R Sheikh
(74) *Attorney, Agent, or Firm* — Rabin & Berdo, P.C.

(57) ABSTRACT

A method of a receiver in a communication system may comprise: transmitting, to a transmitter, artificial intelligence (AI) capability information of the receiver; receiving, from the transmitter, AI model information generated based on the AI capability information; selecting one or more AI models from among a plurality of AI models indicated by the AI model information; transmitting information of the one or more AI models to the transmitter; receiving, from the transmitter, channel state information (CSI) configuration information including information of at least one AI model among the one or more AI models; generating CSI feedback information based on the at least one AI model indicated by the CSI configuration information; and transmitting the CSI feedback information to the transmitter.

18 Claims, 8 Drawing Sheets

(56) References Cited

U.S. PATENT DOCUMENTS

| | | | |
|---|---|---|---|
| 2020/0167611 A1 | 5/2020 | Yoon et al. | |
| 2020/0366326 A1* | 11/2020 | Jassal | G06N 3/08 |
| 2021/0110261 A1 | 4/2021 | Lee et al. | |
| 2021/0195462 A1* | 6/2021 | Pezeshki | H04W 72/23 |
| 2021/0297178 A1 | 9/2021 | Kim et al. | |
| 2021/0328630 A1* | 10/2021 | Ryu | H04B 7/0695 |
| 2021/0351959 A1 | 11/2021 | Zhang et al. | |
| 2022/0043703 A1 | 2/2022 | Hwang | |
| 2022/0116178 A1 | 4/2022 | Go et al. | |
| 2022/0132434 A1 | 4/2022 | Lee et al. | |
| 2023/0232213 A1* | 7/2023 | Hong | H04W 8/24 370/329 |
| 2023/0353460 A1* | 11/2023 | Zhou | G06N 3/0455 |
| 2025/0016593 A1* | 1/2025 | Narayanan et al. | H04L 25/0254 |

\* cited by examiner

APPARATUS AND METHOD FOR TRANSMISSION AND RECEPTION OF CHANNEL STATE INFORMATION BASED ON ARTIFICIAL INTELLIGENCE

CROSS-REFERENCE TO RELATED APPLICATIONS

This application claims priority to Korean Patent Applications No. 10-2022-0059186, filed on May 13, 2022, and No. 10-2023-0061743, filed on May 12, 2023, with the Korean Intellectual Property Office (KIPO), the entire contents of which are hereby incorporated by reference.

BACKGROUND

1. Technical Field

Exemplary embodiments of the present disclosure relate to a technique for transmitting and receiving channel state information by applying an artificial intelligence, and more specifically, to a technique for transferring channel state information with low overhead and high accuracy.

2. Related Art

In a communication network, a transmitter may perform encoding of a data signal according to a coding level, power allocation, and beamforming using multiple transmit antennas in order to transmit data to a receiver. Information on a radio channel between antennas of the transmitter and the receiver for the encoding, power allocation, and beamforming may be acquired by the transmitter. However, since the channel from the transmitter to the receiver cannot be directly observed by the transmitter, a channel state information (CSI) reporting procedure, which is a procedure for reporting channel information measured by the receiver to the transmitter, may be required. CSI may be information for scheduling data transmission from the transmitter to the receiver, and include at least one of rank, channel quality index, and precoding information.

A reference signal, such as a CSI-reference signal (CSI-RS), can be designed to measure the channel state at the receiver, and the transmitter may transmit this CSI-RS periodically or aperiodically. Moreover, information related to CSI-RS transmission can be pre-configured so that the receiver can successfully receive the CSI-RS. After receiving the CSI-RS, the receiver generates CSI and performs a CSI reporting procedure to convey it back to the transmitter. However, accurately representing channel information requires a substantial amount of CSI, which can increase the occupancy and overhead of radio transmission resources, consequently reducing the overall system performance. Notably, effectively capturing the channel variation to determine precoding at the transmitter or providing precoding information for recommending an appropriate precoding vector at the receiver can impose significant overhead. To address the aforementioned challenges in communication networks, research has commenced on leveraging machine learning (ML) techniques to enable the transmitter to acquire highly accurate CSI while minimizing the transmitted information. These techniques are being explored for application in communication systems beyond the 5th generation. An autoencoder-based neural network has been proposed as an ML framework for transmitting channel information. In this approach, the radio channel information can be represented as an image and compressed into a low-dimensional code vector using an encoder network within the autoencoder-based neural network structure. The autoencoder-based neural network can be implemented as a convolutional neural network (CNN)-based or a fully-connected neural network (FNN)-based structure, capable of reconstructing the compressed code vector back into the original radio channel information using a decoder network. Particularly, the CNN-based artificial neural network offers efficient compression and decompression operations. However, there are several issues that have not been adequately addressed for the practical application of these techniques. Firstly, the procedures for implementing them in actual systems have not been thoroughly considered. Secondly, since a single artificial neural network may not be suitable for all radio environments in practical systems, there may be cases where multiple artificial neural networks are required, but this aspect has not been taken into account. Thirdly, the existing proposed artificial neural network structures do not consider the flexibility required in practical systems, as the transmitted information is fixed as radio channel information. Therefore, for the effective application of these techniques in real-world systems, it is essential to design artificial neural networks that can adapt to various information and provide variable accuracy based on the specific radio environment and the amount of CSI feedback information.

SUMMARY

Exemplary embodiments of the present disclosure are directed to providing an artificial intelligence-based apparatus and method for transmitting and receiving channel state information in a communication system.

A method of a receiver, according to a first exemplary embodiment of the present disclosure for achieving the above-described objective, may comprise: transmitting, to a transmitter, artificial intelligence (AI) capability information of the receiver; receiving, from the transmitter, AI model information generated based on the AI capability information: selecting one or more AI models from among a plurality of AI models indicated by the AI model information: transmitting information of the one or more AI models to the transmitter: receiving, from the transmitter, channel state information (CSI) configuration information including information of at least one AI model among the one or more AI models: generating CSI feedback information based on the one or more AI models indicated by the CSI configuration information; and transmitting the CSI feedback information to the transmitter.

The AI capability information includes at least one of information of AI model(s) supported by the receiver, information on an AI computation capability of the receiver, or information on a storage capability of the receiver.

The selecting of the one or more AI models may comprise: estimating an expected performance for each of the plurality of AI models; and selecting the one or more AI models having high expected performance from among the plurality of AI models based on a comparison result of the expected performances of the plurality of AI models.

The one or more AI models having a low CSI overhead among the plurality of AI models may be determined to have the high expected performance.

The one or more AI models having a high expected CSI transmission rate among the plurality of AI models may be determined to have the high expected performance.

The one or more AI models having a low amount of CSI feedback information among the plurality of AI models may be determined to have the high expected performance.

The information of the one or more AI models may include at least one of an identifier or expected performance of each of the one or more AI models.

The generating of the CSI feedback information may comprise: receiving a CSI-reference signal (CSI-RS) from the transmitter: performing a measurement operation on the CSI-RS; and generating the CSI feedback information based on a result of the measurement operation by using the at least one AI model.

The CSI configuration information may further include information on a maximum application time, and the CSI feedback information may be generated using the at least one AI model during a time indicated by the maximum application time.

A method of a receiver, according to a second exemplary embodiment of the present disclosure for achieving the above-described objective, may comprise: transmitting, to a transmitter, artificial intelligence (AI) capability information of the receiver: receiving, from the transmitter, AI model information generated based on the AI capability information; estimating expected performance of each of a plurality of AI models indicated by the AI model information: transmitting information on the expected performances to the transmitter: receiving, from the transmitter, channel state information (CSI) configuration information including information of at least one AI model selected from among the plurality of AI models based on the information on the expected performances: generating CSI feedback information based on the at least one AI model indicated by the CSI configuration information; and transmitting the CSI feedback information to the transmitter.

The AI capability information may include at least one of information of AI model(s) supported by the receiver, information on an AI computation capability of the receiver, or information on a storage capability of the receiver.

The generating of the CSI feedback information may comprise: receiving a CSI-reference signal (CSI-RS) from the transmitter; performing a measurement operation on the CSI-RS; and generating the CSI feedback information based on a result of the measurement operation by using the at least one AI model.

The CSI configuration information may further include information on a maximum application time, and the CSI feedback information may be generated using the at least one AI model during a time indicated by the maximum application time.

A method of a transmitter, according to a third exemplary embodiment of the present disclosure for achieving the above-described objective, may comprise: receiving, from a receiver, artificial intelligence (AI) capability information: generating AI model information indicating a plurality of AI models based on the AI capability information: transmitting the AI model information to the receiver; receiving, from the receiver, information on an expected performance of each of the plurality of AI models indicated by the AI model information: selecting at least one AI model from among the plurality of AI models based on the information on the expected performances: transmitting, to the receiver, channel state information (CSI) configuration information including information of the at least one AI model; and receiving, from the receiver, CSI feedback information generated based on the at least one AI model indicated by the CSI configuration information.

The selecting of the at least one AI model may comprise: selecting the at least one AI model having a high expected performance from among the plurality of AI models based on a comparison result of the expected performances.

The at least one AI model having a low CSI overhead among the plurality of AI models may be determined to have the high expected performance.

The at least one AI model having a high expected CSI transmission rate among the plurality of AI models may be determined to have the high expected performance.

The at least one AI model having a low amount of CSI feedback information among the plurality of AI models may be determined to have the high expected performance.

According to the present disclosure, a receiver can determine an artificial neural network and/or the amount of CSI in order to generate the CSI, and then utilize the artificial neural network to perform a CSI reporting operation. By maintaining the artificial neural network in an optimal state through training, the receiver can efficiently deliver the CSI to a transmitter with minimal overhead and high accuracy. As a result, the CSI reporting operation can be performed effectively, leading to improved performance of the communication system.

DETAILED DESCRIPTION OF THE EMBODIMENTS

Figure 1:
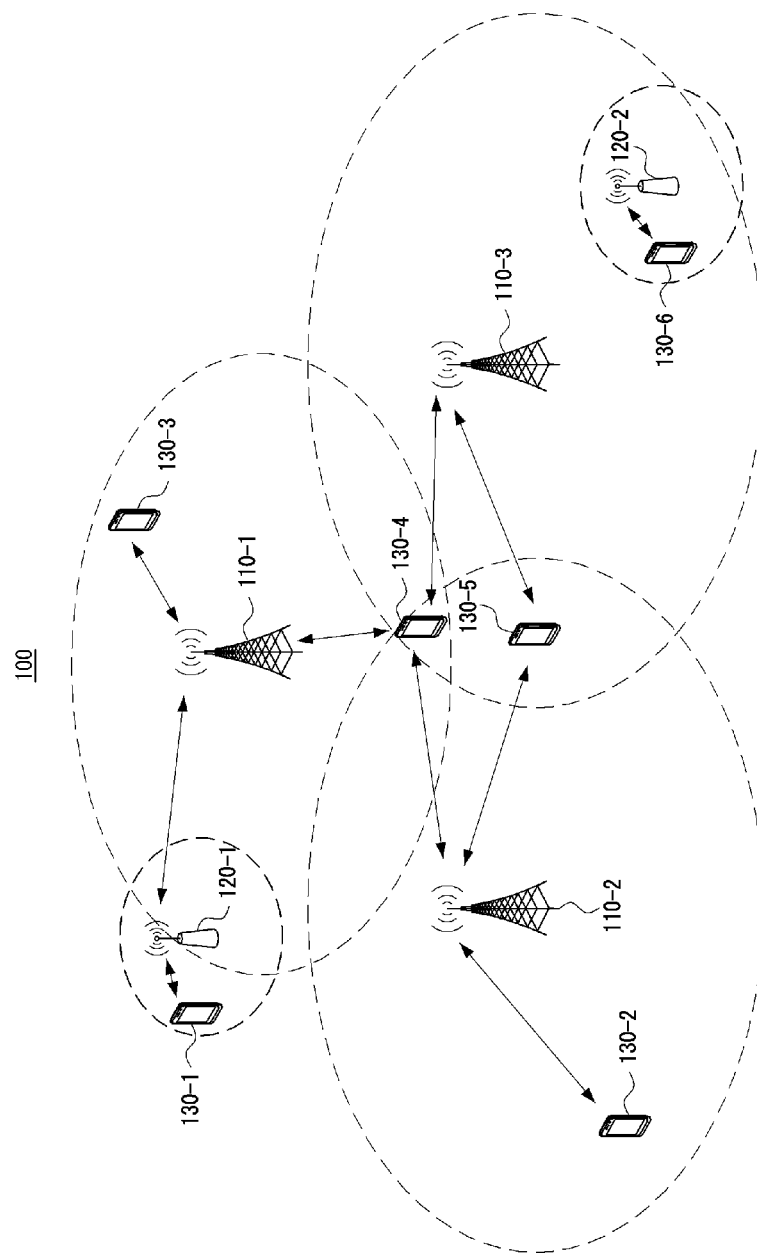
FIG. 1 is a conceptual diagram illustrating a first exemplary embodiment of a communication system.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B".

In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted. A communication system to which exemplary embodiments according to the present disclosure are applied will be described. The communication system may be the 4G communication system (e.g., Long-Term Evolution (LTE) communication system or LTE-A communication system), the 5G communication system (e.g., New Radio (NR) communication system), the sixth generation (6G) communication system, or the like. The 4G communication system may support communications in a frequency band of 6 GHz or below, and the 5G communication system may support communications in a frequency band of 6 GHz or above as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network, 'LTE' may refer to '4G communication system', 'LTE communication system', or 'LTE-A communication system', and 'NR' may refer to '5G communication system' or 'NR communication system'.

In exemplary embodiments, 'configuration of an operation (e.g., transmission operation)' may mean 'signaling of configuration information (e.g., information element(s), parameter(s)) for the operation' and/or 'signaling of information indicating performing of the operation'. 'Configuration of information element(s) (e.g., parameter(s))' may mean that the corresponding information element(s) are signaled. 'Configuration of a resource (e.g., resource region)' may mean that configuration information of the corresponding resource is signaled. The signaling may be performed based on at least one of system information (SI) signaling (e.g., transmission of system information block (SIB) and/or master information block (MIB)), RRC signaling (e.g., transmission of RRC parameters and/or higher layer parameters), MAC control element (CE) signaling, PHY signaling (e.g., transmission of downlink control information (DCI), uplink control information (UCI), and/or sidelink control information (SCI)), or a combination thereof.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)). When the communication system 100 is a 5G communication system (e.g., New Radio (NR) system), the core network may include an access and mobility management function (AMF), a user plane function (UPF), a session management function (SMF), and the like.

The plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may mean an apparatus or a device. Exemplary embodiments may be performed by an apparatus or device. A structure of the apparatus (or, device) may be as follows.

Figure 2:
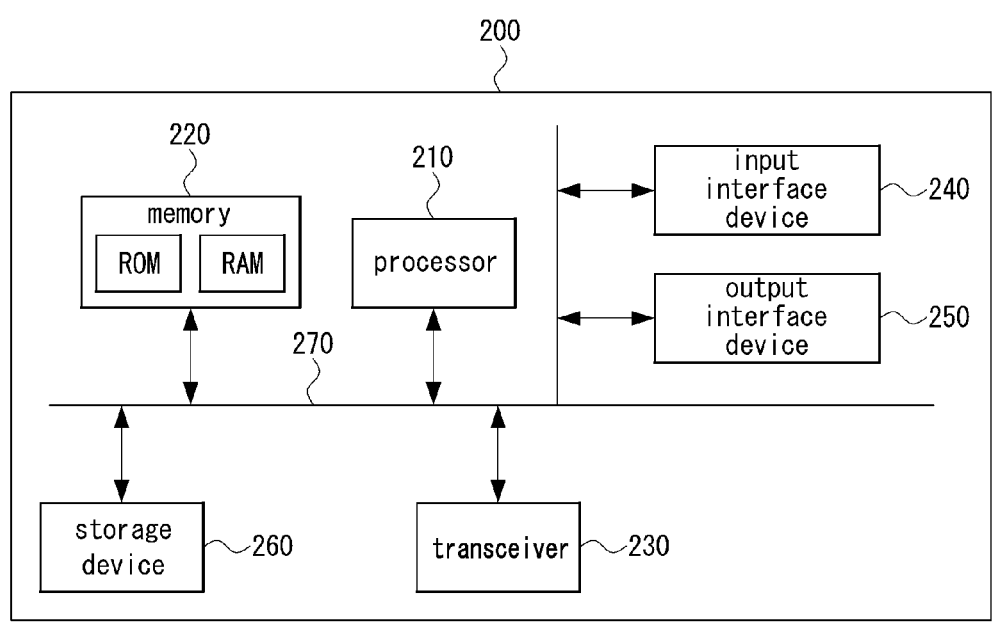
FIG. 2 is a block diagram illustrating a first exemplary embodiment of an apparatus.

FIG. 2 is a block diagram illustrating a first exemplary embodiment of an apparatus. Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the COMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Figure 3:
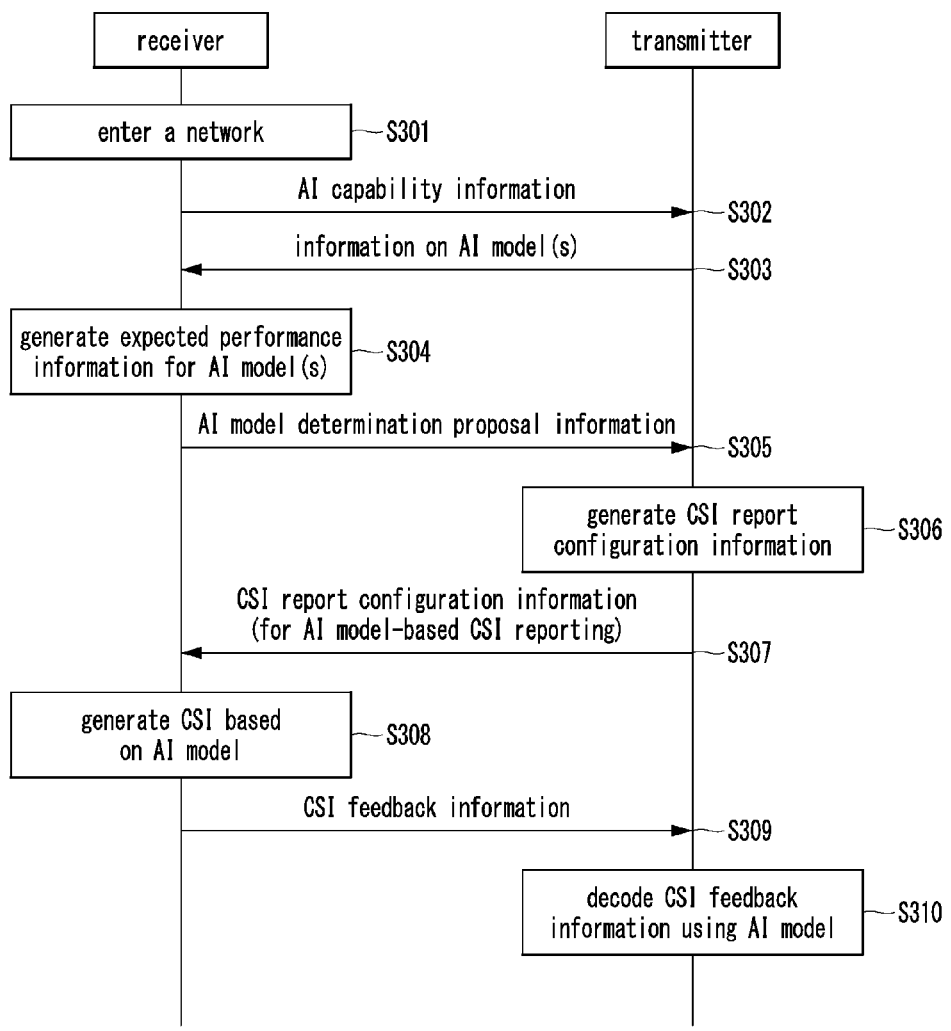
FIG. 3 is a sequence chart illustrating a first exemplary embodiment of an AI-based CSI reporting method.

FIG. 3 is a sequence chart illustrating a first exemplary embodiment of an AI-based CSI reporting method.

Referring to FIG. 3, a receiver may enter a network (S301). In the present disclosure, the receiver may be a terminal and may be located in various devices according to a configuration and type of the network. In the present disclosure, a transmitter may be a base station and may be located in various devices according to the configuration and type of the network. The network may include a core network and an access network. The core network may include a GSM core network, UMTS core network, LTE core network, 5G core network, and/or the like. The access network may include Wi-Fi, fiber to the home (FTTH), mobile access network, and/or the like.

The receiver may receive a synchronization signal block (SSB) from the transmitter. The receiver may acquire system information (SI) based on the SSB. The receiver may enter the network based on the SI. The receiver that has entered the network may transmit AI capability information to the transmitter (S302). In other words, the receiver may inform the transmitter that AI-based channel state information (CSI) delivery is possible. As an example of a method for the receiver to notify that AI-based CSI delivery is possible, the receiver may transmit AI capability information including user equipment (UE) capability information of the terminal configured by a higher layer of the terminal to the transmitter.

The capability information of the terminal may refer to capability information of the receiver. The capability information of the receiver may be information on features supported by the receiver. The capability information of the receiver may include at least one of blind decoding capability information or the AI capability information.

The AI capability information may refer to information on AI model(s) supportable by the receiver, AI computation capability information, and/or storage capability information. The AI capability information may be referred to as Machine Learning (ML) capability information. The AI may refer to ML and/or deep learning. The ML may be an algorithm that allows a computer to performing learning based on data. The AI, ML, and/or deep learning may be performed based on artificial neural networks. As artificial neural networks show excellent performance in various fields, studies using artificial neural networks are gradually being conducted for anomaly detection methods for various equipment used in factories. An autoencoder may be used in artificial neural networks.

The AI capability information of the receiver may be delivered to the transmitter in more detail. The AI capability information may include at least one of information on the computation capability (e.g., FLOPs) allocatable by the receiver for computations for artificial neural networks or information on the storage space (e.g., Mbytes) allocatable by the receiver for storage of AI model(s).

The transmitter may receive the AI capability information delivered by the receiver. The transmitter may determine whether the AI capability of the receiver is satisfactory based on the AI capability information transmitted by the receiver. The transmitter may determine whether the AI capability of the receiver is satisfactory based on whether the AI model(s) configured in the receiver operate efficiently. The transmitter may determine whether the AI capability of the receiver is satisfactory by comparing the AI capability information of the receiver with information on the required AI model-related computation capability. The transmitter may determine whether the AI capability of the receiver is satisfactory by comparing the AI capability information of the receiver and the required computation capability related to an encoder artificial neural network used for generating CSI feedback information at the receiver within an AI model pair.

The transmitter may determine the AI model(s) to be delivered to the receiver when it is determined that the AI capability of the receiver is satisfactory. The transmitter may determine AI model pair(s) without considering the maximum amount of CSI feedback information configurable by the receiver. After determining the AI model pair(s) to be used in the receiver, the transmitter may determine whether the AI model pair(s) are suitable for use in the receiver. The transmitter may determine whether it is appropriate for the receiver to use the AI model pair(s) by considering the AI capability information and/or the maximum amount of CSI feedback information. The maximum amount of CSI feedback information may refer to the maximum amount of CSI feedback information transmittable by the receiver.

After identifying the AI capability information of the receiver, the transmitter may generate information on AI model(s) (i.e., AI model information) usable by the receiver based on the AI capability information received from the receiver. The AI model information may include at least one of the structure or parameter values of each AI model pair. The AI model information may include information of AI model(s) suitable for use by the receiver. The AI model information may include at least one of AI model(s) or AI model pair(s) that satisfy the AI capability of the receiver. The AI model information may include at least one of AI model(s) or AI model pair(s) that satisfy the maximum amount of CSI feedback information transmittable by the receiver.

The AI model information may include at least one of indicator(s), structure(s), parameter(s), type of input information, size of output latent variables, quantization scheme of the output latent variables, or CSI feedback lengths of the AI model(s). Some AI models may support a fixed CSI feedback length. In this case, the AI model may be referred to as a fixed AI model. Alternatively, some AI models may support different CSI feedback lengths. In this case, the AI model may be referred to as a variable AI model. The variable AI model may additionally use parameter(s) for determining the size (length) of CSI feedback. For example, the parameter(s) for determining the size of CSI feedback may be the size of the output latent variables, quantization scheme of the output latent variables, and/or the like. In case that the structure(s) and parameter(s) of the AI model(s) are preloaded in the receiver, the AI model information may include only the indicator(s) of the AI model(s).

The transmitter may deliver information of AI model(s) usable by the receiver to the receiver (S303). The transmitter may deliver information of one or more AI model pairs to the receiver. In other words, when the terminal recognizes that AI-based CSI delivery is possible at the receiver, the transmitter may deliver information on AI model pair(s) configured by the transmitter to the receiver. In addition, the transmitter may deliver information of AI model pair(s) that satisfy the maximum amount of feedback information configurable by the receiver to the receiver. The transmitter may deliver the identification number(s) of the AI model pair(s) to the receiver. Each AI model pair may have a unique identification number. The identification number may mean an index or an identifier. When the AI model(s) are defined and/or trained in the receiver (i.e., when the AI model(s) are pre-loaded in the receiver), the steps S302 and S303 may not be performed.

Meanwhile, the AI model(s) may be implemented based on fully-connected neural network (FNN), convolutional neural network (CNN), autoencoder, and/or the like. The AI model according to the present disclosure may use at least one of unsupervised learning and supervised learning schemes. The AI model may consist of one or more artificial neural networks or one or more artificial neural network pairs. An AI model pair may consist of two or more AI models. An AI model or AI model pair may include at least one of one or more encoder artificial neural networks and one or more decoder artificial neural networks. The transmitter may have at least one of one or more AI models or one or more AI model pairs. The receiver may have at least one of one or more AI models or one or more AI model pairs.

The autoencoder may compress data (e.g., input data) input through an encoder, convert the compressed data to output data having the same size as the input data by using a decoder, and output the output data. In other words, the autoencoder may be a type of deep neural network model that makes the output data of the autoencoder the same as the input data. The autoencoder may learn features of the input data in an unsupervised manner. For learning, the autoencoder may convert data input through the encoder into low-dimensional data that well expresses the corresponding features, and the converted data may be restored to the original data through the decoder.

In the present disclosure, CSI feedback information may refer to information obtained by encoding CSI through the AI model. The AI model pair may consider different CSI types and feedback information sizes. For example, a first AI model may be an AI model applied to transmit MIMO channel information, and a second AI model may be an AI model applied to transmit one wideband eigenvector. A third AI model may use four subbands and may be an AI model applied to transmit one eigenvector of each subband. Accordingly, each AI model pair may consider at least one of various input CSI types or fixed amounts of CSI feedback information. The amount of CSI feedback information may mean the size of information that the receiver can transmit to the transmitter.

The receiver may receive information of the AI model(s) determined by the transmitter based on the AI capability information. The receiver may generate expected performance information using the AI model(s) determined by the transmitter (S304). In other words, the receiver may estimate (or predict, measure) an expected performance of each of a plurality of AI models. The expected performance may include at least one of an expected restoration quality, expected channel quality indicator (CQI) (e.g., achievable CQI), expected CSI overhead, or expected transmission rate. The expected restoration quality may be expressed as cosine similarity. For example, the expected restoration quality may indicate a similarity between a final precoding vector obtained by an encoding operation and a decoding operation at the receiver and a precoding vector input to the receiver.

The CSI overhead may mean the size of CSI feedback. When an AI model generates CSI (e.g., CSI feedback) having a variable size, the CSI overhead may refer to a minimum CSI overhead required to satisfy a reference performance (e.g., expected restoration quality above a threshold). The CSI overhead may be used as an expected performance for a variable AI model. When the CSI overhead is used as an expected performance, the reference performance may be predefined. Alternatively, the reference performance may be signaled to the receiver. The signaling may refer to a transmission operation of information and/or message(s).

The AI model information may include information on one or more AI models. The receiver may generate one or more pieces of expected performance information based on the one or more AI models. The expected performance may consider a low overhead of CSI feedback information, high transmission accuracy, and minimization of the amount of CSI feedback information. A low CSI overhead may mean that the expected performance of the AI model is high, and a high CSI overhead may mean that the expected performance of the AI model is low. A high CSI transmission accuracy (e.g., high expected CSI transmission rate) may mean that the expected performance of the AI model is high, and a low CSI transmission accuracy may mean that the expected performance of the AI model is low. A small amount of CSI feedback information may mean that the expected performance of the AI model is high, and a large amount of CSI feedback information may mean that the expected performance of the AI model is low. The expected performance information may include the expected restoration quality of CSI.

The receiver may select an AI model considering the expected performance(s). For example, the receiver may select an AI model when it is determined that the expected performance(s) of the AI model are appropriate. That the expected performance(s) are appropriate may mean that the expected performance(s) are high. As an example of a method of selecting a suitable AI model pair, the receiver may perform a CSI compression and restoration procedure using each AI model pair, and use a squared error between restored CSI and original CSI before the compression to quantify the expected restoration quality. When CSI to be delivered is precoding information (e.g., precoding vector) of transmit antennas, the receiver may quantify the expected reconstruction quality using cosine similarity. The cosine similarity between two vectors may have a value between −1 and 1, and the closer the cosine similarity between the two vectors is to 1, the more similar the two vectors may be. The closer the cosine similarity between the two vectors is to −1, the more different the two vectors may be. If the cosine similarity between two vectors is 0, the two vectors may not be related to each other. When the CSI is precoding information (e.g., precoding vector), an achievable CQI value or an expected transmission rate for an AI model may be a criterion for determining an AI model pair by the receiver.

The receiver may select at least one AI model (e.g., at least one AI model having high expected performance(s)) among a plurality of AI models by comparing the expected performances of the plurality of AI models. The receiver may select at least one AI model from among the plurality of AI models by comparing the amounts of CSI feedback information of the plurality of AI models.

The receiver may compare the expected performances considering a hysteresis. The receiver may compare the expected performance(s) of a new AI model with the expected performance(s) of a non-AI model by considering a hysteresis. The receiver may compare the expected performance(s) of a new AI model with the expected performance(s) of the existing AI model by considering a hysteresis. If the expected performance(s) of the new AI models are greater than or equal to a specific threshold, the receiver may determine that the expected performance(s) of the new AI model is better than that of the existing AI model. In other words, the receiver may determine that the expected performance of the new AI model is better if the expected transmission rate of the new AI model is greater than the expected transmission rate of the non-AI model. The expected transmission rate may mean transmission accuracy. For example, the receiver may determine that the expected performance of the new AI model is better if the expected transmission rate of the new AI model is greater than the expected transmission rate of the existing AI model.

The receiver may compare the amounts of CSI feedback information considering a hysteresis. The receiver may compare the CSI feedback information amount by the non-AI model and the CSI feedback information amount by the new AI model in consideration of a hysteresis. The receiver may compare the CSI feedback information amount by the existing AI model and the CSI feedback information amount by the new AI model in consideration of a hysteresis. If the amount of CSI feedback information of the new AI model is less than a specific threshold, the receiver may determine that the amount of CSI feedback information of the new AI model is smaller than that of the existing AI model.

The receiver may derive an expected performance not only when applying the AI model-based reporting mode, but also when applying the existing non-AI model-based reporting mode. Even when a current CSI reporting mode of the receiver is a non-AI model-based reporting mode, if the expected performance through one or more AI models is better and/or if the amount of CSI feedback information to be delivered when using the AI model(s) is smaller, the receiver may request a change of the CSI reporting mode from the non-AI model-based reporting mode to the AI model-based reporting mode. Information for requesting the change of the reporting mode may include at least one of identification number of the AI model or information on a degree of improvement in data transmission.

When a request for estimating the performance of the AI model is received from the transmitter, the receiver may perform the step S304. Alternatively, the step S304 may be performed regardless of the request of estimating the performance. The request of estimating the performance may include an expected performance of the AI model (e.g., expected performance threshold). The expected performance may include at least one of the restoration quality, CSI overhead, transmission rate, or achievable CQI. When the expected performance is the expected restoration quality, one or more AI models satisfying the expected restoration quality among the plurality of AI models may be determined to have a high expected performance. When the expected performance is the achievable CQI, one or more AI models satisfying the expected performance among the plurality of AI models may be determined to have a high expected performance.

In addition, the request of estimating the performance may further include information indicating whether the expected performance of each AI model is to be estimated periodically or aperiodically. When the expected performance of the AI model is periodically estimated, the request of estimating the performance may further include information on a periodicity (e.g., time interval). In addition, the request of estimating the performance may further include information on report target(s). The information on report target(s) may include the number of AI models to be reported. The number of AI models to be reported may be less than or equal to the number of supportable AI models. When the number of AI models to be reported is equal to the number of supportable AI models, the receiver may not inform the transmitter of the identifiers of the AI models. In other words, the operation of reporting the identifier of each of the AI models may be omitted. The request of estimating the performance may be transmitted and received together with the AI model information in the step S303.

The receiver may select an AI model to be applied to the receiver for CSI generation. The receiver may select a suitable AI model by measuring the expected performances of AI model pairs that achieve the maximum expected performance(s) in the receiver. The receiver may select an AI model pair that achieves the maximum expected performance(s). The receiver may select at least one of a fixed or variable AI model. Alternatively, the receiver may apply a non-AI model. The transmitter may transmit at least one of information on an AI model and information on a non-AI model that the receiver can select to the receiver.

The receiver may transmit AI model determination proposal information to the transmitter (S305). The AI model determination proposal information may include information on one or more AI models selected by the receiver. The information on the one or more AI models may include identification numbers of the one or more AI models. An AI model may refer to an AI model pair. The receiver may deliver to the transmitter an identification number of an AI model pair to be applied in the current channel environment among one or more AI model pairs delivered by the transmitter. The transmitter may receive the AI model determination proposal information transmitted by the receiver.

The transmitter may determine an AI model based on the AI model determination proposal information transmitted by the receiver. The AI model determination proposal information may include characteristics for each AI model pair. The transmitter may determine an AI model to be applied to the receiver by additionally considering characteristics (e.g., amount of CSI feedback information) of each AI model pair as well as the expected performance for each AI model pair.

The transmitter may generate CSI report configuration information based on the determined AI model (S306). After the AI model to be applied to the transmitter and/or receiver is determined, the transmitter may generate CSI report configuration information in consideration of the determined AI model.

The CSI report configuration information may include at least one of CSI-interference management (IM) resource-related information, CSI measurement configuration-related information, CSI resource configuration information, CSI-RS resource-related information, or CSI report configuration. The CSI report configuration information may include a report configuration type parameter (e.g., reportConfigType) representing a time domain behavior and/or a report quantity parameter (e.g., reportQuantity) representing a CSI-related quantity. The time domain behavior may indicate one of periodic, aperiodic or semi-persistent.

The CSI report configuration information may include at least one of information on the AI model usable by the receiver, information on an encoder artificial neural network, information on a decoder artificial neural network, information on an identification number of an artificial neural network pair, or information on a maximum application time of the AI model. In the present disclosure, the receiver may have one or more AI models for the generation of CSI feedback information. In addition, in the present disclosure, the transmitter may have one or more AI models for the restoration of CSI feedback information. The CSI feedback information generated by the CSI feedback generation AI model of the receiver may be restored through the CSI feedback restoration AI model of the transmitter corresponding to the CSI feedback information of the receiver. The CSI feedback generation AI model in the receiver and the CSI feedback restoration AI model in the transmitter may be indicated as an AI model pair. The AI model of the receiver (e.g., CSI feedback generation AI model) may correspond to the AI model of the transmitter (e.g., CSI feedback restoration AI model).

In the present disclosure, the AI model in the receiver and transmitter may be a common AI model, and the common AI model may be pre-loaded in the receiver and transmitter. Alternatively, information of the common AI model may be delivered to the receiver and the transmitter at most once. In addition, some AI model pairs may be configured in a form including a common receiver-side AI model or a common transmitter-side AI model. Different AI models may be indicated by identification numbers. In addition, a predefined encoding and decoding method may be configured by being identified by an identification number for indicating a common AI model. For example, a non-ML-based encoding and decoding method may be indicated by being given an identification number similar to a common AI model. In the present disclosure, the transmitter may configure a maximum application time (i.e., timeout) to the AI model. The transmitter may set an identification number to the AI model for which the maximum application time is set. In addition, if CSI feedback information generated using the AI model exists even after the maximum application time has elapsed, the receiver may request the transmitter to update the AI model. The transmitter may transmit at least one of information on a new AI model pair or information on a new maximum application time to the receiver at the request of the receiver.

The transmitter may transmit CSI report configuration information for CSI reporting using the AI model to the receiver (S307). The receiver may receive the CSI report configuration information transmitted by the transmitter.

The receiver may generate CSI feedback information using the AI model (S308). In other words, the receiver may perform a measurement operation on a CSI-RS based on the CSI report configuration information (e.g., CSI configuration information). The CSI-RS may be transmitted from the transmitter. The receiver may generate the CSI feedback information (e.g., CSI feedback information derived from a result of the measurement operation on the CSI-RS) using the AI model indicated by the CSI report configuration information. When the CSI report configuration information includes information on the maximum application time for the AI model, the receiver may generate the CSI feedback information using the AI model indicated by the CSI report configuration information within the maximum application time. When the maximum application time has elapsed, the receiver may not use the AI model indicated by the CSI report configuration information.

When the receiver receives CSI report configuration information indicating two or more AI models, the receiver may generate CSI feedback information using one of the two or more AI models. An identifier of the AI model used in generating the CSI feedback information may be additionally included in the CSI feedback information. When the AI model used in generating the CSI feedback information is a variable AI model, parameter(s) for determining the size of the CSI feedback information may be additionally included in the CSI feedback information. For example, the parameter(s) for determining the size of the CSI feedback information may be configuration information on the quantization of latent variables.

The receiver may transmit the CSI feedback information to the transmitter (S309). When reporting the CSI feedback information, the receiver may transmit information of one or more AI models applied to generate the CSI feedback information to the transmitter. In other words, the CSI feedback information may include information on the one or more AI models used for generating the CSI feedback information. The transmitter may receive the CSI feedback information transmitted by the receiver. The transmitter may decode the CSI feedback information received from the receiver through the AI model (S310). In the step S310, the transmitter may acquire CSI of the receiver by performing a decoding operation.

Meanwhile, the receiver may transmit a request of changing the AI model (i.e., AI model change request) to the transmitter. When the AI model change request is received, the transmitter may change the AI model. The transmitter may transmit CSI report configuration information including information of a changed AI model to the receiver. The receiver may receive the CSI report configuration information from the transmitter. The receiver may generate CSI feedback information using the changed AI model indicated by the CSI report configuration information, and may transmit the CSI feedback information to the transmitter. The transmitter may receive the CSI feedback information from the receiver, and may acquire CSI by applying the changed AI model to the CSI feedback information.

The transmitter may receive information of a trained AI model from the receiver. The transmitter may change the AI model based on information of the trained AI model. The transmitter may transmit information of the changed AI model to the receiver. Before transmitting the information of the changed AI model to the receiver, the transmitter may restore CSI from the CSI feedback information by using the existing AI model.

The operation of restoring the CSI from the CSI feedback information may be performed by the AI model. Alternatively, the CSI restoration operation may not be performed by the AI model. In this case, the CSI restoration operation may be performed in a predefined scheme. In the CSI restoration operation, a PMI expression method, a Type I codebook, and the like may be considered.

Figure 4:
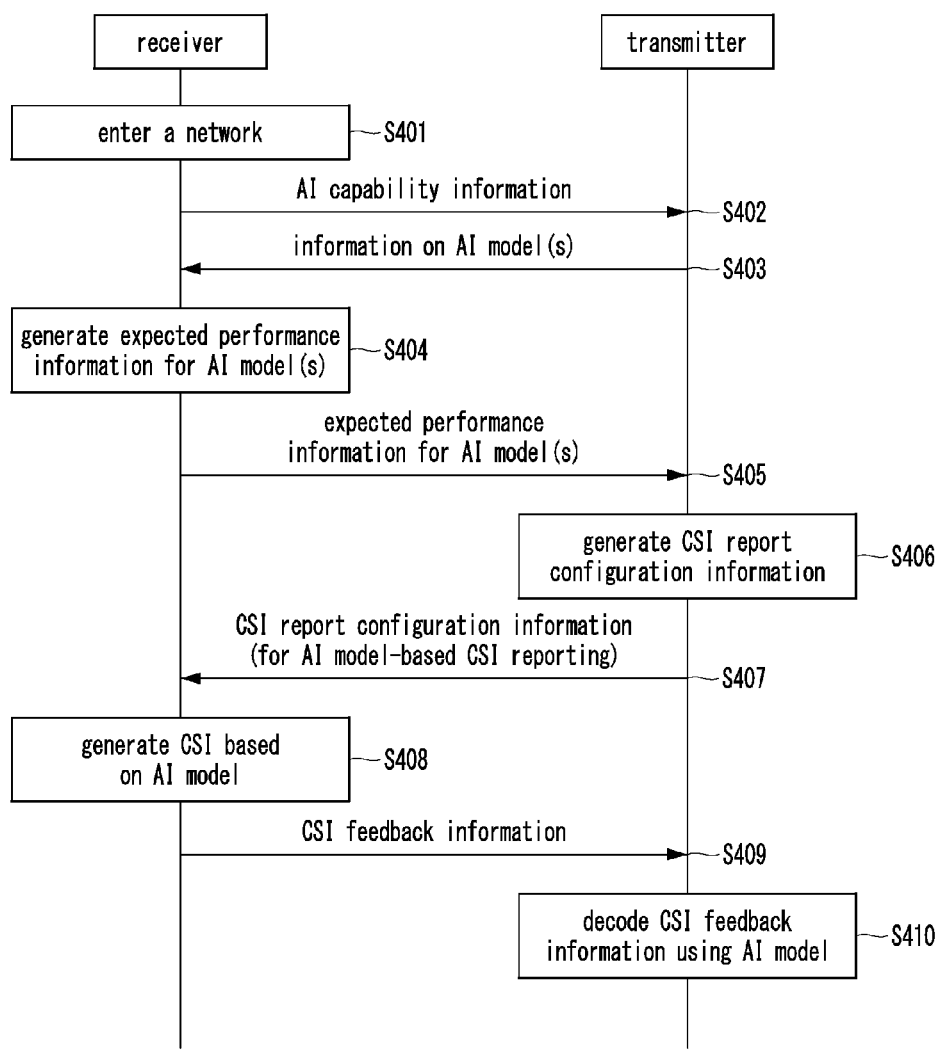
FIG. 4 is a sequence chart illustrating a second exemplary embodiment of an AI-based CSI reporting method.

FIG. 4 is a sequence chart illustrating a second exemplary embodiment of an AI-based CSI reporting method.

Referring to FIG. 4, a receiver may enter a network (S401). The receiver may be a terminal, and the transmitter may be a base station. The receiver that has entered the network may transmit AI capability information to the transmitter (S402). As an example of a method for the receiver to notify that AI-based CSI delivery is possible, the receiver may transmit AI capability information including UE capability information of the terminal configured by a higher layer of the terminal to the transmitter. The AI capability information of the receiver may be delivered to the transmitter in more detail. The AI capability information may include at least one of information on the computation capability (e.g., FLOPs) allocatable by the receiver for computations for artificial neural networks or information on the storage space (e.g., Mbytes) allocatable by the receiver for storage of AI model(s).

The transmitter may receive the AI capability information transmitted by the receiver. The transmitter may determine whether the AI capability of the terminal is satisfactory based on the AI capability information delivered by the receiver. The transmitter may determine whether the AI capability of the receiver is satisfactory based on whether the AI model(s) configured in the receiver operate efficiently. The transmitter may determine whether the AI capability of the receiver is satisfactory by comparing the AI capability information of the receiver with information on the required AI model-related computation capability. The transmitter may determine whether the AI capability of the receiver is satisfactory by comparing the AI capability information of the receiver and the required computation capability related to an encoder artificial neural network used for generating CSI feedback information at the receiver within an AI model pair.

The transmitter may determine AI model(s) to be delivered to the receiver when it is determined that the AI capability of the receiver is satisfactory. The transmitter may determine AI model pair(s) without considering the maximum amount of CSI feedback information configurable by the receiver. When the AI capability information of the receiver is confirmed, the transmitter may generate information on AI model(s) (i.e., AI model information) usable by the receiver based on the AI capability information received from the receiver. The AI model information may include at least one of the structure or parameter values of each AI model pair. The AI model information may include information of AI model(s) suitable for use by the receiver. The AI model information may include at least one of AI model(s) or AI model pair(s) that satisfy the AI capability of the receiver. The AI model information may include at least one of AI model(s) or AI model pair(s) that satisfy the maximum amount of CSI feedback information transmittable by the receiver.

The AI model information may include at least one of indicator(s), structure(s), parameter(s), type of input information, size of output latent variables, quantization scheme of the output latent variables, or CSI feedback lengths of the AI model(s). Some AI models may support a fixed CSI feedback length. In this case, the AI model may be referred to as a fixed AI model. Alternatively, some AI models may support different CSI feedback lengths. In this case, the AI model may be referred to as a variable AI model. The variable AI model may additionally use parameter(s) for determining the size (length) of CSI feedback. For example, the parameter(s) for determining the size of CSI feedback may be the size of the output latent variables, the quantization scheme of the output latent variables, and/or the like. In case that the structure(s) and parameter(s) of the AI model(s) are preloaded in the receiver, the AI model information may include only the indicator(s) of the AI model(s).

The transmitter may transmit information of the AI model(s) usable by the receiver to the receiver (S403). The transmitter may deliver information of one or more AI model pairs to the receiver. In other words, when the terminal recognizes that AI-based CSI delivery is possible at the receiver, the transmitter may deliver information on the AI model pair(s) configured by the transmitter to the receiver. In addition, the transmitter may deliver information of AI model pair(s) that satisfy the maximum amount of feedback information configurable by the receiver to the receiver. The transmitter may transmit the identification number(s) of the AI model pair(s) to the receiver. When the AI model(s) are defined and/or trained in the receiver (i.e., when the AI model(s) are pre-loaded in the receiver), the steps S402 and S403 may not be performed.

The receiver may receive information of the AI model(s) determined by the transmitter based on the AI capability information. The receiver may generate expected performance information using the AI model(s) determined by the transmitter (S404). The information of the AI model(s) may include information on one or more AI models. The receiver may generate one or more pieces of expected performance information based on the one or more AI models.

The receiver may select an AI model when it is determined that the expected performance(s) of the AI model are appropriate. As an example of a method of selecting a suitable AI model pair, the receiver may perform a procedure of compressing and restoring CSI using each AI model pair to quantify an expected restoration quality based on ae square error with original CSI before compression. When the CSI is precoding information (e.g., vector) of transmit antennas, the receiver may quantify the expected restoration quality using cosine similarity.

The receiver may select one or more AI models from among a plurality of AI models. The receiver may select one or more AI models from among the plurality of AI models by comparing the expected performances of the plurality of AI models. The receiver may select one or more AI models from among the plurality of AI models by comparing the amounts of CSI feedback information of the plurality of AI models.

The receiver may compare the expected performances considering a hysteresis. The receiver may compare the expected performance(s) of a new AI model with the expected performance(s) of a non-AI model by considering a hysteresis. The receiver may compare the expected performance(s) of a new AI model with the expected performance(s) of an old AI model by considering a hysteresis. If the expected performance(s) of the new AI model is greater than or equal to a specific threshold, the receiver may determine that the expected performance(s) of the new AI model is better than that of the existing AI model.

The receiver may compare the amounts of CSI feedback information in consideration of a hysteresis. The receiver may compare the CSI feedback information amount by a non-AI model and the CSI feedback information amount by a new AI model in consideration of a hysteresis. The receiver may compare the CSI feedback information amount by the existing AI model and the CSI feedback information amount by a new AI model in consideration of a hysteresis. If the amount of CSI feedback information of the new AI model is less than a specific threshold, the receiver may determine that the amount of CSI feedback information of the new AI model is smaller than that of the existing AI model.

The receiver may derive the expected performance not only when applying the AI model-based reporting mode, but also when applying the existing non-AI model-based reporting mode. Even when a current CSI reporting mode of the receiver is a non-AI mode-based reporting mode, if the expected performance through one or more AI models is better and/or if the amount of CSI feedback information to be delivered when using the AI model(s) is smaller, the receiver may request a change of the CSI reporting mode from the non-AI model based reporting mode to the AI mode-based reporting mode. Information for requesting the change of the reporting mode may include at least one of identification number of the AI model or information on a degree of improvement in data transmission.

When a request for estimating the performance of the AI model is received from the transmitter, the receiver may perform the step S404. Alternatively, the step S404 may be performed regardless of the request of estimating the performance. The request of estimating the performance may include an expected performance of the AI model (e.g., expected performance threshold). The expected performance may include at least one of the restoration quality, CSI overhead, transmission rate, or achievable CQI. When the expected performance is the expected restoration quality, one or more AI models satisfying the expected restoration quality among the plurality of AI models may be determined to have a high expected performance. When the expected performance is the achievable CQI, one or more AI models satisfying the expected performance among the plurality of AI models may be determined to have a high expected performance.

In addition, the request of estimating the performance may further include information indicating whether the expected performance of each AI model is to be estimated periodically or aperiodically. When the expected performance of the AI model is periodically estimated, the request of estimating the performance may further include information on a periodicity (e.g., time interval). In addition, the request of estimating the performance may further include information on report target(s). The information on report target(s) may include the number of AI models to be reported. The number of AI models to be reported may be less than or equal to the number of supportable AI models. When the number of AI models to be reported is equal to the number of supportable AI models, the receiver may not inform the transmitter of the identifiers of the AI models. In other words, the operation of reporting the identifier of each of the AI models may be omitted. The request of estimating the performance may be transmitted and received together with the AI model information in the step S403.

The receiver may select an AI model to be applied to the receiver for CSI generation. The receiver may select a suitable AI model by measuring the expected performances of AI model pairs that satisfy the maximum amount of CSI feedback information configurable by the receiver. The receiver may select an AI model pair that satisfy the maximum amount of CSI feedback information. The receiver that the receiver can select may be a fixed or variable AI model. Alternatively, the receiver may apply a non-AI model. The transmitter may transmit at least one of information on an AI model and information on a non-AI model that the receiver can select to the receiver.

The receiver may transmit expected performance information on selected AI model(s) to the transmitter (S405). The receiver may transmit an identification number of one AI model pair most suitable for the current radio channel to the transmitter, as well as the expected performance of each AI model pair to the transmitter. The transmitter may receive the expected performance information of the AI model(s) transmitted by the receiver.

The transmitter may determine AI model(s) based on the expected performance information (e.g., expected restoration quality, CSI overhead, CSI transmission accuracy, and/or CSI feedback information amount) for AI model(s) transmitted by the receiver. The transmitter may determine AI model(s) to apply to the receiver by further considering the characteristics of each AI model pair as well as the expected performance for each AI model pair. The transmitter may determine AI model(s) based on a comparison result of the expected performances of the AI models in the same and/or similar method to that of the step S304 in the exemplary embodiment of FIG. 3. The transmitter may generate CSI report configuration information based on the determined AI model(s) (S406). After the AI model(s) to be applied to the transmitter and/or receiver are determined, the transmitter may generate CSI report configuration information in consideration of the determined AI model(s).

The CSI report configuration information may include at least one of information on the AI model usable by the receiver, information on an encoder artificial neural network, information on a decoder artificial neural network, information on an identification number of an artificial neural network pair, or information on a maximum application time of the AI model.

In the present disclosure, the AI model in the receiver and transmitter may be a common AI model, and the common AI model may be pre-loaded in the receiver and transmitter. Alternatively, information of the common AI model may be delivered to the receiver and the transmitter at most once. In addition, some AI model pairs may be configured in a form including a common receiver-side AI model or a common transmitter-side AI model. Different AI models may be indicated by identification numbers. In addition, a predefined encoding and decoding method may be configured by being identified by an identification number for indicating a common AI model. For example, a non-ML-based encoding and decoding method may be indicated by being given an identification number similar to a common AI model.

The transmitter may configure a maximum application time (i.e., timeout) to the AI model. The transmitter may set an identification number to the AI model for which the maximum application time is set. In addition, if CSI feedback information generated using the AI model exists even after the maximum application time has elapsed, the receiver requests the transmitter to update the AI model. The transmitter may transmit at least one of information on a new AI model pair or information on a new maximum application time to the receiver at the request of the receiver.

The transmitter may transmit CSI report configuration information for CSI reporting using the AI model to the receiver (S407). The receiver may receive the CSI report configuration information transmitted by the transmitter. The receiver may generate CSI feedback information using the AI model (S408). In other words, the receiver may perform a measurement operation on a CSI-RS based on the CSI report configuration information (e.g., CSI configuration information). The CSI-RS may be transmitted from the transmitter. The receiver may generate the CSI feedback information (e.g., CSI feedback information derived from a result of the measurement operation on the CSI-RS) using the AI model indicated by the CSI report configuration information.

When the CSI report configuration information includes information on the maximum application time for the AI model, the receiver may generate the CSI feedback information using the AI model indicated by the CSI report configuration information within the maximum application time. When the maximum application time has elapsed, the receiver may not use the AI model indicated by the CSI report configuration information.

When the receiver receives CSI report configuration information indicating two or more AI models, the receiver may generate CSI feedback information using one of the two or more AI models. An identifier of the AI model used in generating the CSI feedback information may be additionally included in the CSI feedback information. When the AI model used in generating the CSI feedback information is a variable AI model, parameter(s) for determining the size of the CSI feedback information may be additionally included in the CSI feedback information. For example, the parameter(s) for determining the size of the CSI feedback information may be configuration information on the quantization of latent variables.

The receiver may transmit the CSI feedback information to the transmitter (S409). When reporting the CSI feedback information, the receiver may transmit information of one or more AI models applied to generate the CSI feedback information to the transmitter. In other words, the CSI feedback information may include information on the one or more AI models used for generating the CSI feedback information. The transmitter may receive the CSI feedback information transmitted by the receiver. The transmitter may decode the CSI feedback information received from the receiver through the AI model (S410). In the step S410, the transmitter may acquire the CSI of the receiver by performing a decoding operation.

Meanwhile, the receiver may transmit a request of changing the AI model (i.e., AI model change request) to the transmitter. When the AI model change request is received, the transmitter may change the AI model. The transmitter may transmit CSI report configuration information including information of a changed AI model to the receiver. The receiver may receive the CSI report configuration information from the transmitter. The receiver may generate CSI feedback information using the changed AI model indicated by the CSI report configuration information, and may transmit the CSI feedback information to the transmitter. The transmitter may receive the CSI feedback information from the receiver, and may acquire CSI by applying the changed AI model to the CSI feedback information.

The transmitter may receive information of a trained AI model from the receiver. The transmitter may change the AI model based on information of the trained AI model. The transmitter may transmit information of the changed AI model to the receiver. Before transmitting the information of the changed AI model to the receiver, the transmitter may restore CSI from the CSI feedback information by using the existing AI model.

Figure 5:
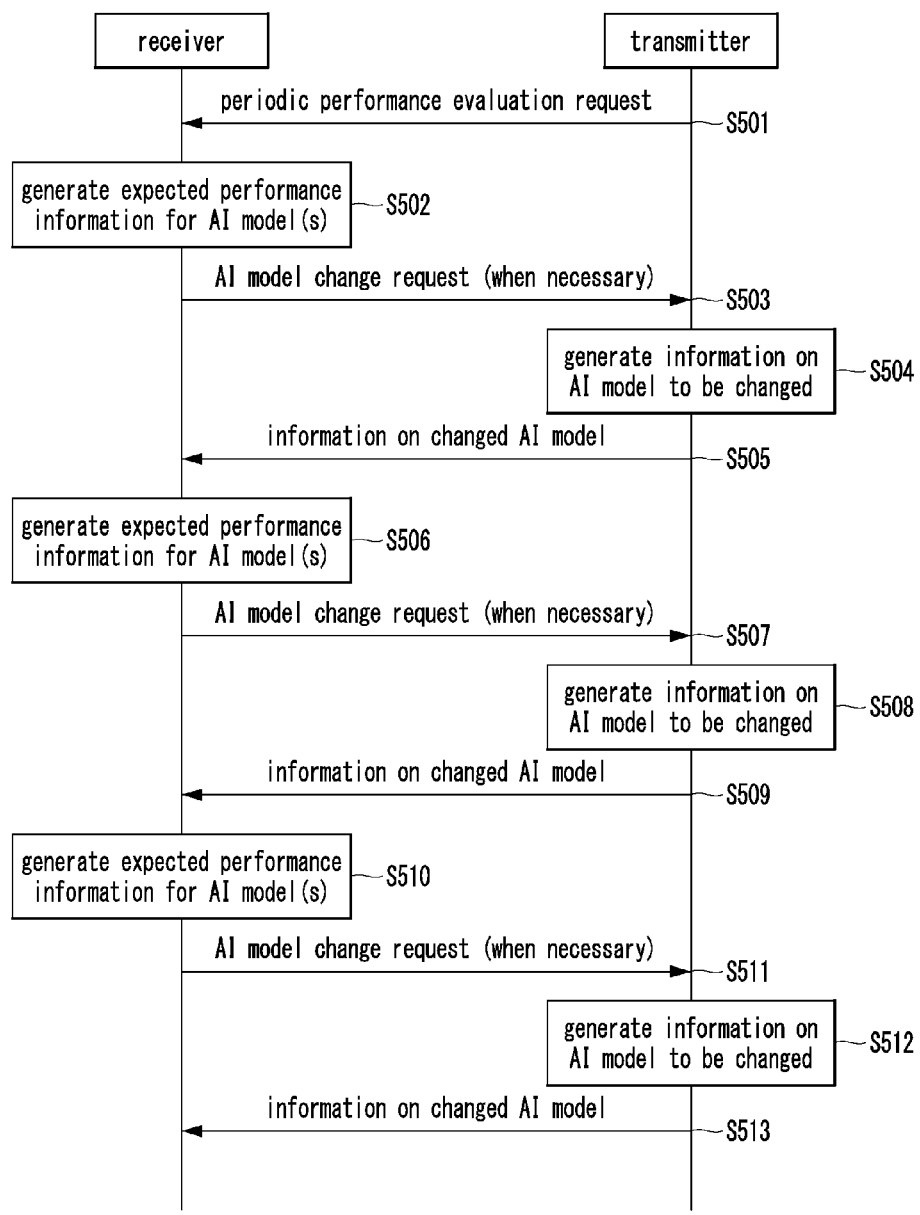
FIG. 5 is a sequence chart illustrating a third exemplary embodiment of an AI-based CSI reporting method.

FIG. 5 is a sequence chart illustrating a third exemplary embodiment of an AI-based CSI reporting method.

Referring to FIG. 5, a transmitter may request periodic quality evaluation from the receiver (S501). The transmitter may request a quality evaluation by setting a certain time interval. In addition, the transmitter may request quality evaluation while transmitting the AI model information to the receiver. The receiver may receive the request of periodic quality evaluation transmitted by the transmitter.

The receiver may generate expected performance(s) for one or more AI models (S502). The expected performance(s) may consider a low overhead of CSI, high transmission accuracy, and minimization of the amount of CSI feedback information. The expected performance information may include an expected restoration quality of CSI.

The receiver may select an AI model if it is determined that the expected performance information generated by the AI model is appropriate. As an example of a method of selecting a suitable AI model pair, the receiver may perform a procedure of compressing and restoring CSI using each AI model pair, and quantifying an expected reconstruction quality using a square error with original CSI before compression. When the CSI is precoding information (e.g., vector) of transmit antennas, the receiver may quantify an expected restoration quality using cosine similarity. When the CSI is precoding information (e.g., vector), an achievable CQI value or an expected transmission rate of the AI model corresponding to the expected restoration quality may be a criterion for determining an AI model pair by the receiver.

The receiver may select one or more AI models from among a plurality of AI models. The receiver may select one or more AI models from among the plurality of AI models by comparing the expected performances of the plurality of AI models. The receiver may select one or more AI models from among the plurality of AI models by comparing the amounts of CSI feedback information of the plurality of AI models.

The receiver may compare the expected performances considering a hysteresis. The receiver may compare the expected performance(s) of a new AI model with the expected performance(s) of a non-AI model by considering a hysteresis. The receiver may compare the expected performance(s) of a new AI model with the expected performance(s) of an old AI model by considering a hysteresis. If the expected performance(s) of the new AI model is greater than or equal to a specific threshold, the receiver may determine that the expected performance(s) of the new AI model is better than that of the existing AI model. The receiver may compare the amounts of CSI feedback information in consideration of a hysteresis. The receiver may compare the CSI feedback information amount by a non-AI model and the CSI feedback information amount by a new AI model in consideration of a hysteresis. The receiver may compare the CSI feedback information amount by the existing AI model and the CSI feedback information amount by a new AI model in consideration of a hysteresis. If the amount of CSI feedback information of the new AI model is less than a specific threshold, the receiver may determine that the amount of CSI feedback information of the new AI model is smaller than that of the existing AI model.

The receiver may derive the expected performance not only when applying the AI model-based reporting mode, but also when applying the existing non-AI model-based reporting mode. Even when a current CSI reporting mode of the receiver is a reporting mode based on a non-AI model, if the expected performance through one or more AI models is better and/or if the amount of CSI feedback information to be delivered when using the AI model(s) is smaller, the receiver may request a change of the CSI reporting mode from the non-AI model-based reporting mode to the AI model-based reporting mode. Information for requesting the change of the reporting mode may include at least one of identification number of the AI model or information on a degree of improvement in data transmission.

The receiver may transmit a request of changing the AI model (i.e., AI mode change request) to the transmitter (S503). The case in which the AI model needs to be changed may include at least one of a case when the expected performance is poor, a case when the AI model is not applicable, a case when the amount of CSI feedback information exceeds the maximum amount, or a case when a non-AI model needs to be applied. When the AI model needs to be changed, the receiver may transmit the AI model change request to the transmitter. The AI model change request may include at least one of expected performance information and AI model information.

When the current CSI reporting mode of the receiver is an AI model-based report mode, the receiver may request to change the current CSI reporting mode. If the expected performances through all AI models are worse than the expected performance when the AI models are not applied, the receiver may request a change of the CSI reporting mode from the AI model-based reporting mode to the existing non-AI model-based reporting mode. If the amount of CSI feedback information in the case of using the AI model is greater than the amount of CSI feedback information in the case of not using the AI model, the receiver may request a change of the CSI reporting mode from the AI model-based reporting mode to the existing non-AI model-based reporting mode.

Without determining which AI model to change, the receiver may deliver expected performance information based on a plurality of AI models to the transmitter. The receiver may deliver expected performance information by a technique not using AI model(s) (hereinafter referred to as 'non-AI model-based reporting mode'). The transmitter may receive the AI model change request transmitted by the receiver. The transmitter may change the current CSI reporting mode from the AI model-based reporting mode to the non-AI model-based reporting mode based on the expected performance information by the non-AI model-based reporting mode received from the receiver.

The transmitter may generate information of AI model(s) to be changed at the request of the receiver (S504). The transmitter may change one or more AI model pairs. If there are one or more receivers being applied to each AI model pair, the transmitter may transmit information on the AI model(s) to be changed to all of the one or more receivers. The transmitter may change the AI model pair of the receiver after the latest maximum application time among previously configured AI models in all the receivers. In addition, the transmitter may generate information of changed (i.e., new) AI model(s).

When receiving from the receiver a change of requesting to change to a non-AI model-based reporting mode, the transmitter may release the application of the AI model according to the request of the receiver. The transmitter may transmit information of the changed AI model(s) to the receiver (S505). The receiver may receive information of the changed AI model(s) transmitted by the transmitter. The receiver may measure the expected performance of the changed AI model(s) (S506). The information of the changed AI model(s) may include application information of a non-AI model-based reporting mode. When receiving the request of applying a non-AI model-based reporting mode from the receiver, the transmitter may release the application of the AI model(s). The transmitter may transmit information on the non-AI model-based reporting mode for releasing the application of the AI model(s) to the receiver. The steps S506 to S509 and/or the steps S510 to S513 may be performed identically or similarly to the steps S502 to S505 described above.

Figure 6:
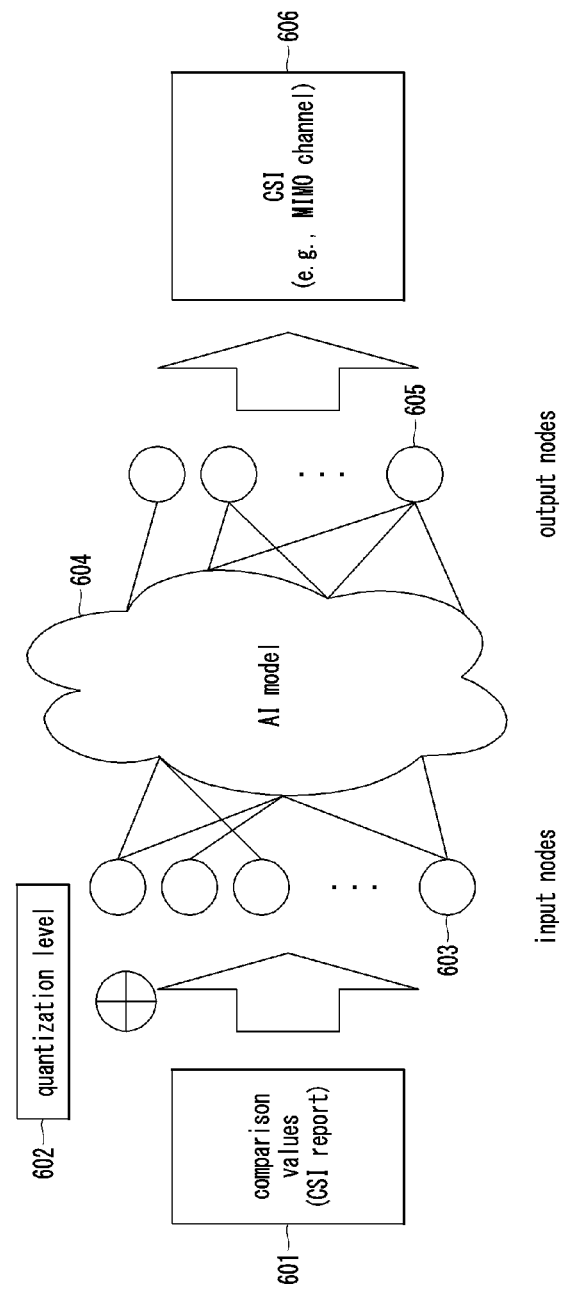
FIG. 6 is a conceptual diagram illustrating a first exemplary embodiment of a method for determining the amount of CSI information.

FIG. 6 is a conceptual diagram illustrating a first exemplary embodiment of a method for determining the amount of CSI information.

Referring to FIG. 6, a receiver may include at least one of input node(s) or output node(s) of an AI model. The transmitter may include at least one of input node(s) or output node(s) of an AI model. The AI model may include at least one of an input layer, a hidden layer, and an output layer. The input layer may have a structure in which several nodes are connected to each other, and patterns of data may be learned and predicted through such the connection structure. The output layer may have a structure in which several nodes are connected to each other, and patterns of data may be learned and predicted through such the connection structure. The hidden layer may have a structure in which several nodes are connected to each other, and patterns of data may be trained and predicted through such the connection structure. The input layer may receive data. The hidden layer may process values input from the input layer. The AI model or decoder artificial neural network may include the hidden layer. The transmitter may acquire CSI through the AI model. The output layer may serve to output a result predicted by the AI model.

Data input through the AI model may be comparison values (e.g., CSI report) or information on a quantization level 602. The data may be data obtained by compressing CSI through the AI model, and may be input to the input node(s) of the AI model. The transmitter or receiver may be configured with one or more AI models.

The comparison values (e.g., CSI report) 601 may be CSI feedback information compressed through the AI model of the receiver. The CSI report may include at least one of CSI feedback information, amount of CSI feedback information, quantization level, number of unit information, number of subbands, or number of eigenvectors.

The quantization level 602 may be determined in consideration of the maximum amount of CSI feedback information. In addition, the quantization level may be determined by considering a degree of quantization. The receiver may determine the quantization level for expressing information of each input node by itself. To represent the information of input node(s), the receiver may additionally transmit information on the quantization level to the transmitter.

The input node(s) 603 may receive the CSI feedback information. The input node(s) may configure comparison values input to the input nodes in consideration of the quantization level. The transmitter may reconfigure a comparison value input to each input node using at least one of the quantization levels delivered from the receiver and the CSI feedback information received from the receiver. The transmitter may know how many bits are used in the input node(s) to express the comparison value input to each input node. The input node may be a node included in the input layer.

The transmitter and receiver may share the number of input nodes used to represent an encoding unit of each variable AI model. When a variable AI model using MIMO channel information as unit information is used, the transmitter may use 32 input nodes to represent the unit information. When the transmitter uses the variable AI model using MIMO channel information as unit information, the receiver may deliver at least 32 pieces of information for delivering the MIMO channel information to the transmitter. However, the number of input nodes is not limited thereto.

The AI model(s) 604 may include at least one of a variable AI model and a fixed AI model. Each of the AI models for reporting CSI feedback information considered in the present disclosure may not have a fixed amount of CSI feedback information. The variable AI model may be an AI model that dynamically generates CSI feedback information in the receiver.

When the transmitter intends to configure the variable AI model similarly to a fixed AI model, the transmitter may include at least one of information on a quantization level and information on the number of subbands, which are determined by the receiver, in AI model pair information. The AI model may perform a procedure for restoring the CSI feedback information received from the receiver. The transmitter may acquire CSI through a restoration procedure.

In the structure of the AI model of the communication system, the number of nodes included in the hidden layer may be set to be greater than or equal to the number of nodes included in the output layer. In addition, the respective nodes of the hidden layer may be configured to be connected to the respective nodes of the input layer and the output layer in a fully connected manner. The output node(s) 605 of the output layer may output information calculated in the hidden layer. The information output through the output node may include CSI 606. The output node may be a node included in the output layer. The CSI 606 may be obtained through the AI model. The CSI may include MIMO channel information.

Figure 7:
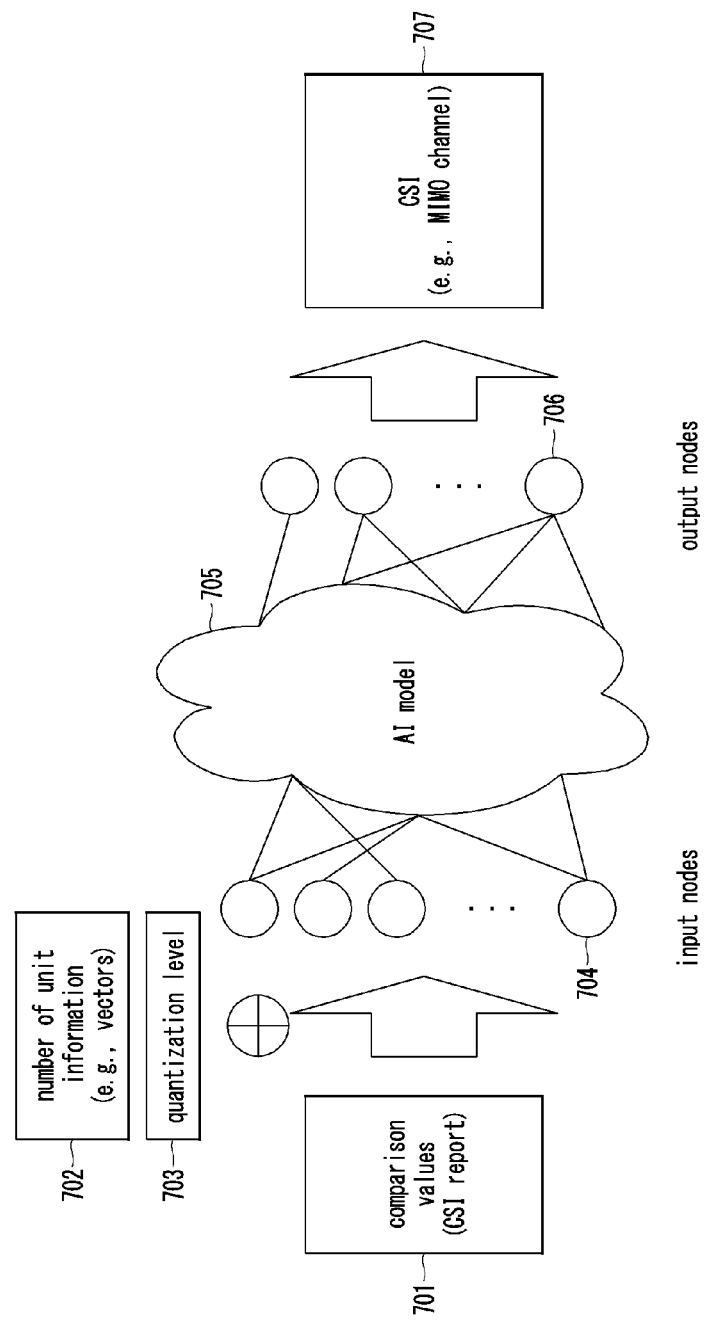
FIG. 7 is a conceptual diagram illustrating a second exemplary embodiment of a method for determining the amount of CSI information.

FIG. 7 is a conceptual diagram illustrating a second exemplary embodiment of a method for determining the amount of CSI information.

Referring to FIG. 7, a receiver may transmit at least one of CSI feedback information, quantization level information, comparison value information, and the number of unit information. The comparison value (e.g., CSI report) 701 may be CSI feedback information compressed through the AI model of the receiver. The CSI report may include at least one of the CSI feedback information, amount of CSI feedback information, quantization level, number of unit information, number of subbands, or number of eigenvectors.

The number 702 of unit information may include vector information. The receiver may determine the number of unit information to be transmitted. The unit information may be an eigenvector. When the receiver transmits eigenvector(s) to the transmitter through the AI model, the receiver may transmit one eigenvector suitable for the entire wideband channel environment to the transmitter. Alternatively, the receiver may transmit eigenvectors respectively for several (e.g., four) subbands to the transmitter. When the receiver determines the number of unit information to be transmitted, the receiver may additionally transmit the number of unit information to be transmitted to the transmitter using the CSI feedback information. The receiver may determine the number of unit information in consideration of the maximum amount of CSI feedback information.

The quantization level 703 may be determined in consideration of the maximum amount of CSI feedback information. In addition, the quantization level may be determined by considering a degree of quantization. The receiver may determine the quantization level for expressing information of each input node by itself. To represent the information of input node(s), the receiver may additionally transmit information on the quantization level to the transmitter.

The input node(s) 703 may receive the CSI feedback information. The input node(s) may configure comparison values input to the input nodes in consideration of the quantization level. The transmitter may reconfigure a comparison value input to each input node using at least one of the quantization level, the number of unit information, or the CSI feedback information delivered from the receiver. The transmitter may know how many bits are used in the input node(s) to express the comparison value input to each input node.

The transmitter and receiver may share the number of input nodes used to represent an encoding unit of each variable AI model. When a variable AI model using MIMO channel information as unit information is used, the transmitter may use 32 input nodes to represent the unit information. When the transmitter uses the variable AI model using MIMO channel information as unit information, the receiver may deliver at least 32 pieces of information for delivering the MIMO channel information to the transmitter. However, the number of input nodes is not limited thereto.

The AI model(s) 705 may include at least one of a variable AI model and a fixed AI model. Each of the AI models for reporting CSI feedback information considered in the present disclosure may not have a fixed amount of CSI feedback information. The variable AI model may be an AI model that dynamically generates CSI feedback information in the receiver.

When the transmitter intends to configure the variable AI model similarly to a fixed AI model, the transmitter may include at least one of information on a quantization level and information on the number of subbands, which are determined by the receiver, in AI model pair information. The AI model may perform a procedure for restoring the CSI feedback information received from the receiver. The transmitter may acquire CSI through a restoration procedure.

Figure 8:
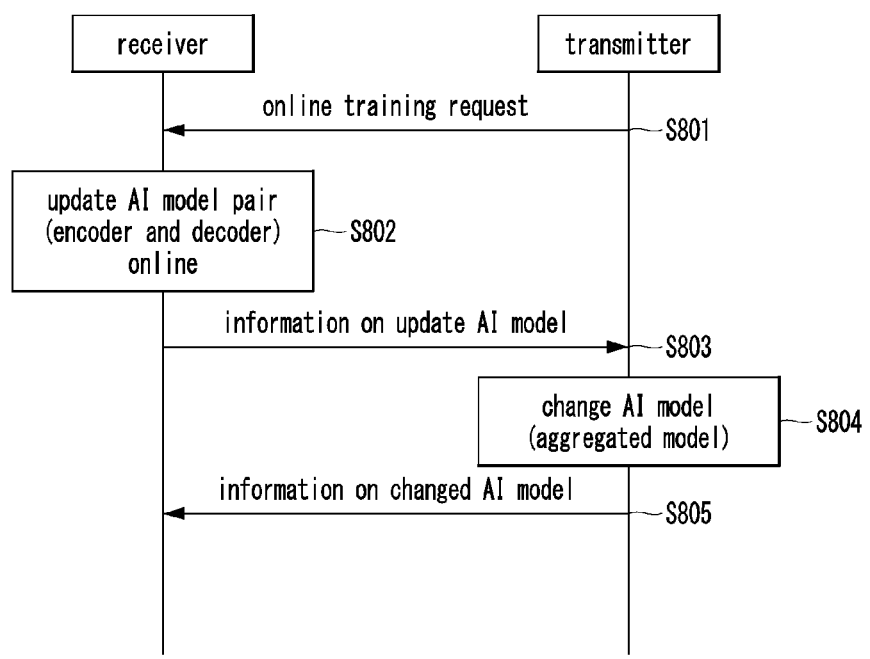
FIG. 8 is a sequence chart illustrating a first exemplary embodiment of a method for supporting AI model training.

In the structure of the AI model of the communication system, the number of nodes included in the hidden layer may be set to be greater than or equal to the number of nodes included in the output layer. In addition, the respective nodes of the hidden layer may be configured to be connected to the respective nodes of the input layer and the output layer in a fully connected manner. The output node(s) 706 of the output layer may output information calculated in the hidden layer. The information output through the output node may include CSI 707. The output node may be a node included in the output layer. The CSI 707 may be obtained through the AI model. The CSI may include information of multiple vectors. FIG. 8 is a sequence chart illustrating a first exemplary embodiment of a method for supporting AI model training.

Referring to FIG. 8, the transmitter may request online training to the receiver in order to apply an appropriate AI model (S801). In other words, the transmitter may request training of the AI model to the receiver. An online training request for the AI model may set a reporting time when transmitting CSI report configuration information or when transmitting information on a changed AI model. Information on the reporting time may be expressed as a specific time or time interval. The receiver may receive the online training request transmitted by the transmitter.

The receiver may update an AI model pair in an online training manner (S802). The receiver may transmit information of the updated AI model to the transmitter (S803). The receiver may transmit information on a difference between the updated AI model and the existing AI model to the transmitter in order to transmit information of the updated AI model. In addition, the receiver may compress and transmit the information on the difference between the updated AI model and the existing AI model. The transmitter may preconfigure whether to deliver the information on the difference between the updated AI model and the existing AI model to the receiver. The transmitter may preconfigure whether or not to compress and deliver the information on the difference between the updated AI model and the existing AI model to the receiver. The transmitter may request the receiver to train the AI model based on whether to deliver the information on the difference between the updated AI model and the existing AI model. The transmitter may request the receiver to train the AI model based on whether to compress and deliver the information on the difference between the updated AI model and the existing AI model. The transmitter may also configure a compression scheme in the receiver. An example of the compression scheme may be a Sign Stochastic Gradient Descent (SignSGD) scheme.

The transmitter may receive the information of the updated AI model transmitted by the receiver. The transmitter may change the existing AI model based on the information of the updated AI model (S804). In addition, the transmitter may receive one or more updated AI models from one or more receivers. The transmitter may derive an AI model aggregated in consideration of the updated AI models. The transmitter may derive an updated model by aggregating the existing AI model and the updated AI models. The transmitter may change the existing AI model to the updated AI model.

The transmitter may transmit information of the changed AI model to the receiver (S805). The transmitter may transmit information of the entire AI model. Alternatively, the transmitter may transmit only information on the difference between a basic AI model (or existing AI model) and the updated AI model. The receiver may receive information of the changed AI model transmitted by the transmitter. The receiver may generate CSI feedback information based on the changed AI model. The receiver may transmit the CSI feedback information to the transmitter. The transmitter may acquire CSI from the CSI feedback information using the AI model.

In the present disclosure, an AI model pair may mean a pair of a transmitter AI model and a receiver AI model. The transmitter AI model may refer to an AI model located in the transmitter, and the receiver AI model may refer to an AI model located in the receiver. 'Using a specific AI model pair indicator' may mean 'simultaneously indicating a transmitter AI model and a receiver AI model'. In the present disclosure, an 'indicator (e.g., AI model pair indicator)' may be described as an indicator indicating an AI model pair for convenience of description, but an indicator may indicate a transmitter AI model or a receiver AI model instead of an AI model pair. In this case, a counterpart AI model (e.g., a receiver AI model or a transmitter AI model) may be derived by a separate scheme (e.g., table information, etc.).

The operations of the method according to the exemplary embodiment of the present disclosure can be implemented as a computer-readable program or code in a computer-readable recording medium. The computer-readable recording medium may include all kinds of recording apparatus for storing data which can be read by a computer system. Furthermore, the computer-readable recording medium may store and execute programs or codes which can be distributed in computer systems connected through a network and read through computers in a distributed manner. The computer-readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of the functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a receiver in a communication system, comprising:
    transmitting, to a transmitter, artificial intelligence (AI) capability information of the receiver indicating that AI-based channel state information (CSI) delivery is possible;
    receiving, from the transmitter, information of one or more AI model pairs indicating one or more decoder artificial neural networks in the AI capability information;
    determining at least one first AI model pair among the one or more AI model pairs, the at least one first AI model pair including one or more first encoder artificial neural networks corresponding to one or more first decoder artificial neural networks belonging to the one or more decoder artificial neural networks;
    transmitting, to the transmitter, AI model determination proposal information indicating an identifier of the at least one first AI model;
    receiving, from the transmitter, CSI report configuration information generated based on the AI model determination proposal information;
    generating CSI feedback information using at least one encoder artificial neural network indicated by the CSI report configuration information; and
    transmitting, to the transmitter, a CSI report including the CSI feedback information.

2. The method according to claim 1, wherein the determining the at least one first AI model pair comprises:
    estimating an expected performance of each of the one or more AI model pairs; and
    determining the at least one first AI model pair among the one or more AI model pairs based on the expected performance, and
    wherein the AI model determination proposal information further indicates the estimated expected performance.

3. The method according to claim 2, wherein the estimating the expected performance comprises:
    performing a CSI compression/restoration operation using each of the one or more AI model pairs; and
    determining a squared error between restored CSI based on the CSI compression/restoration operation and original CSI,
    and the estimated expected performance is an expected restoration quality value for each of the one or more AI model pairs based on the squared error.

4. The method according to claim 2, wherein the estimating the expected performance comprises:
    performing a CSI compression/restoration operation using each of the one or more AI model pairs; and
    determining a cosine similarity between a restored precoding vector obtained based on the CSI compression/restoration operation and an original vector, and
    wherein the estimated expected performance is an expected restoration quality value for each of the one or more AI model pairs based on the cosine similarity.

5. The method according to claim 3, wherein the at least one encoder artificial neural network supports fixed CSI feedback lengths based on at least one of a quantization level or a number of subbands indicated by the CSI report configuration information.

6. The method according to claim 1, prior to the determining, further comprising:
    receiving, from the transmitter, a request for estimating an expected performance, the request indicating an expected performance type,
    wherein the expected performance type includes at least one of restoration quality, CSI overhead, transmission rate, or achievable channel quality indicator (CQI).

7. The method according to claim 2, prior to the estimating, further comprising:
    receiving, from the transmitter, a request for estimating an expected performance of an existing AI model pair used by the receiver,
    wherein the expected performance of the existing AI model pair is further estimated and the AI model determination proposal information further indicates the expected performance of the existing AI model pair.

8. The method according to claim 2, prior to the estimating, further comprising:
    receiving, from the transmitter, a request for estimating an expected performance of an existing non-AI model used by the receiver;
    wherein the expected performance of the existing non-AI model is further estimated and the AI model determination proposal information further indicates the expected performance of the existing non-AI model.

9. The method according to claim 6, wherein the request for estimating the expected performance is received periodically, and the AI determination proposal information is transmitted periodically.

10. The method according to claim 1, prior to the generating, further comprising:
    determining a quantization level based on a maximum amount of CSI feedback information transmittable by the receiver;
    wherein the CSI report further indicates the quantization level.

11. The method according to claim 1, wherein the CSI report further indicates a number of input nodes of the at least one encoder artificial neural network.

12. A method of a transmitter in a communication system, comprising:
- receiving, from a receiver, artificial intelligence (AI) capability information indicating that AI-based channel state information (CSI) delivery by the receiver is possible;
- determining whether AI capability of the receiver is satisfactory based on comparison results between the AI capability information and information on required AI model-related computation capability;
- determining one or more AI model pairs including one or more decoder artificial neural networks based on whether AI capability of the receiver is satisfactory;
- transmitting, to the receiver, information of the one or more AI model pairs;
- receiving, from the receiver, information of an expected performance for the one or more AI model pairs;
- determining at least one AI model pair to be applied to the receiver and the transmitter from among the one or more AI model pairs based on the information of the expected performance;
- transmitting, to the receiver, CSI report configuration information including information of the at least one AI model pair; and
- receiving, from the receiver, a CSI report including CSI feedback information generated based on at least one encoder artificial neural network belonging to the at least one AI model pair.

13. The method according to claim 12, wherein the information of the at least one AI model pair includes at least one of a quantization level or a number of subbands.

14. The method according to claim 12, wherein the information of the expected performance includes an expected restoration quality value for each of the one or more AI model pairs.

15. The method according to claim 12, subsequent to transmitting the information of the one or more AI model pairs, further comprising:
- transmitting, to the receiver, a request for estimating an expected performance for each of the one or more AI model pairs periodically,
- wherein the information of the expected performance is received periodically.

16. The method according to claim 12, subsequent to receiving the information of the expected performance, further comprising:
- determining whether to change a CSI reporting mode based on non-AI model based expected performance information indicated by the information of the expected performance,
- wherein the CSI report configuration information further includes information indicating the CSI reporting mode based on whether to change the CSI reporting mode.

17. The method according to claim 12, wherein the CSI report configuration information further includes a number of input nodes of the at least one AI model pair to be applied to the receiver and the transmitter.

18. The method according to claim 13, further comprising:
- generating original CSI based on the CSI feedback information using at least one decoder artificial neural network belonging to the at least one AI model pair,
- wherein the at least one decoder artificial neural network supports a fixed CSI feedback length based on at least one of the quantization level or the number of subbands.

* * * * *